United States Patent [19]
Sakai et al.

[11] Patent Number: 5,021,898
[45] Date of Patent: Jun. 4, 1991

[54] HEAD POSITIONING CONTROL METHOD AND APPARATUS

[75] Inventors: Yuji Sakai, Yokohama; Toshihiro Sugaya, Tokyo, both of Japan

[73] Assignee: Kabushiki Kaisha Toshiba, Kawasaki, Japan

[21] Appl. No.: 268,865

[22] Filed: Nov. 8, 1988

[30] Foreign Application Priority Data

Nov. 10, 1987 [JP] Japan ................................ 62-282015

[51] Int. Cl.$^5$ ........................ G11B 5/55; G11B 21/08
[52] U.S. Cl. ............................... 360/78.04; 360/77.08; 369/32
[58] Field of Search ............... 360/77.02, 77.03, 77.05, 360/77.08–77.11, 78.04–78.08, 78.11, 78.14, 78.07; 369/32, 33, 41, 43, 44, 44.27, 44.28, 44.32

[56] References Cited

U.S. PATENT DOCUMENTS

| | | | |
|---|---|---|---|
| 4,106,058 | 8/1978 | Romeas et al. | 369/32 |
| 4,499,511 | 2/1985 | Sugaya | 360/78.06 |
| 4,631,606 | 12/1986 | Sugaya | 360/78.14 |
| 4,636,885 | 1/1987 | Yamada et al. | 360/78.14 |

FOREIGN PATENT DOCUMENTS

51-131607 11/1976 Japan .

Primary Examiner—Vincent P. Canney
Assistant Examiner—Steven R. Garland
Attorney, Agent, or Firm—Oblon, Spivak, McClelland, Maier & Neustadt

[57] ABSTRACT

A head positioning control system has a speed control mode in which a head is moved by controlling a speed of said head and a position control mode in which the head is positioned onto a target track in accordance with position data of the head attained from servo data. The head positioning control system controls the movement of the head in the speed control mode until the head reaches within a first predetermined distance from the target track, and switches the control mode to the position control mode when the head reaches within the first predetermined distance from the target track, whereby the head is controlled to track the target track. When the head shifts from the target track by a second predetermined distance or more in the position control mode, this control system switches the mode to the speed control mode and immediately executes a control sequence from the speed control mode to the position control mode, starting at the head's current position.

15 Claims, 6 Drawing Sheets

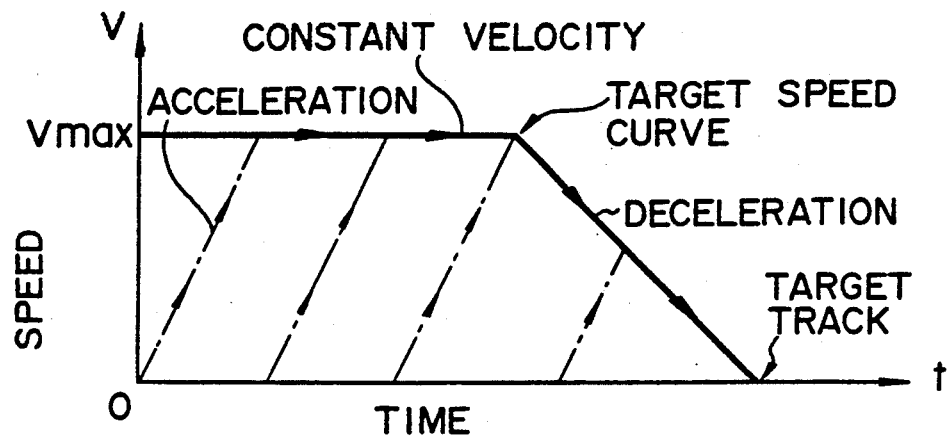
F I G. 1A
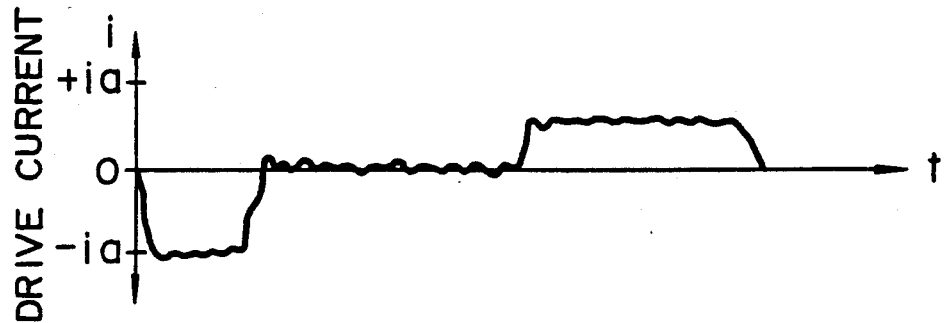
F I G. 1B
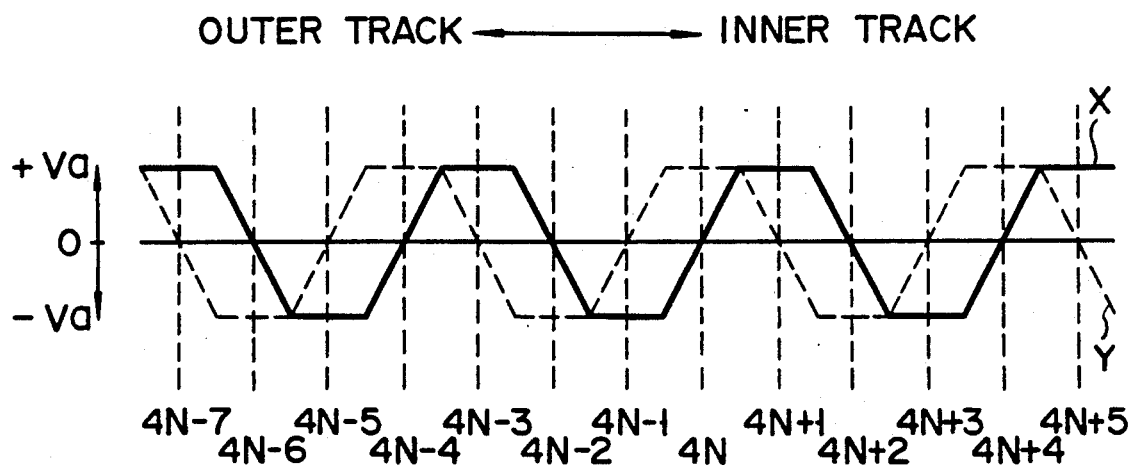
F I G. 2

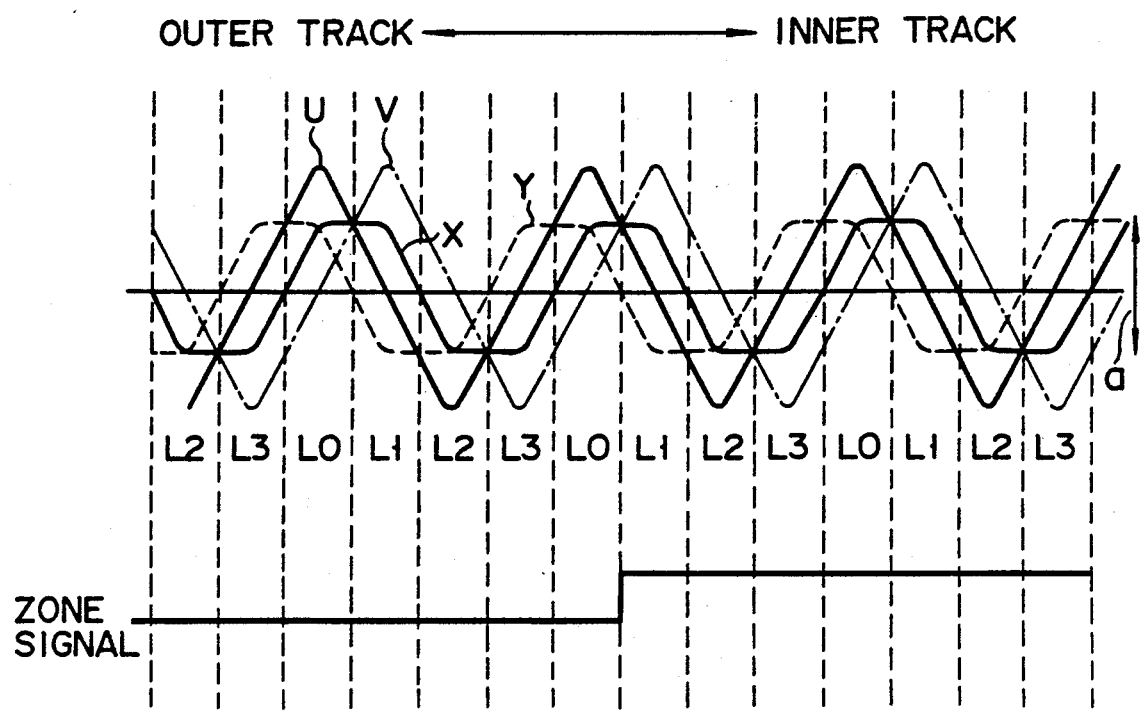
F I G. 4A
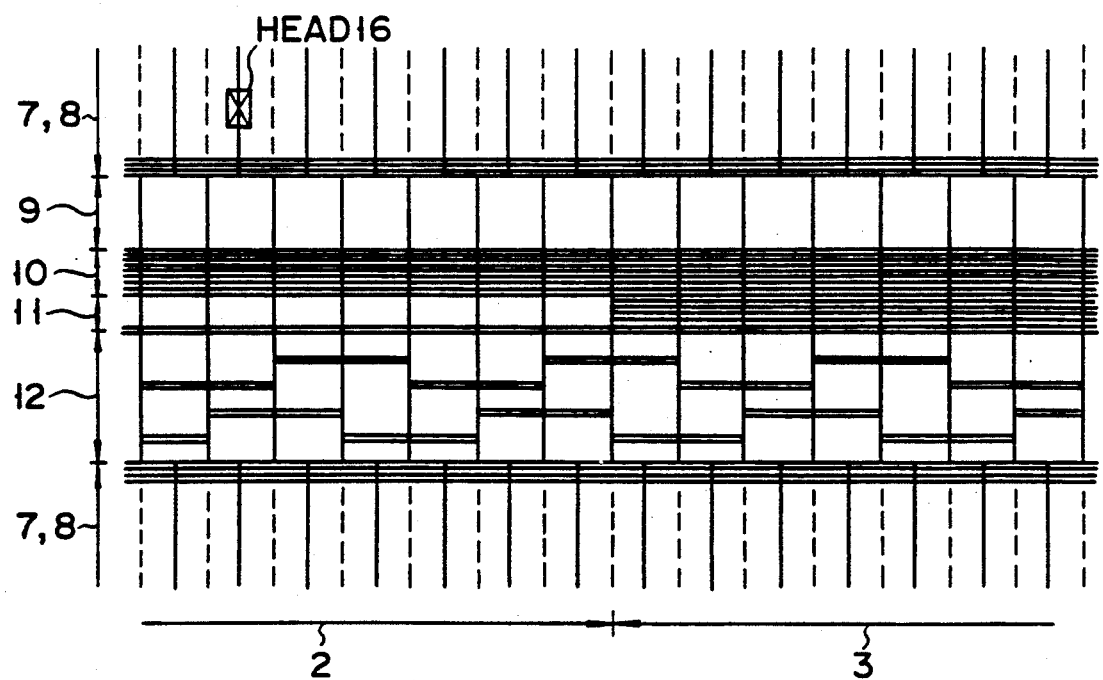
F I G. 4B

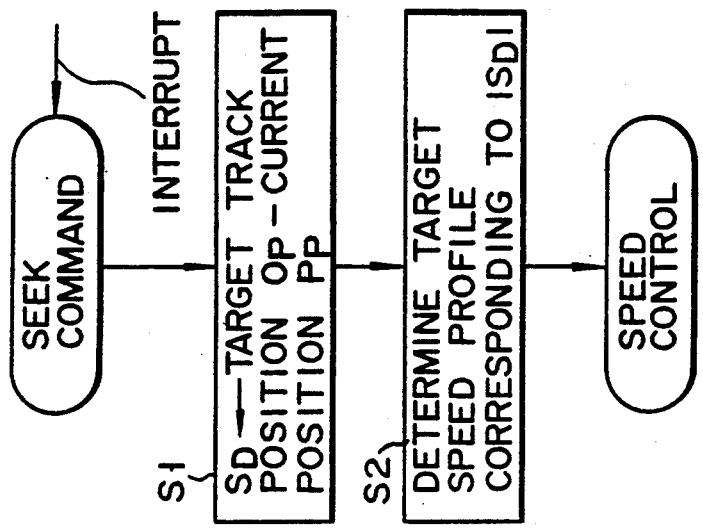
F I G. 6
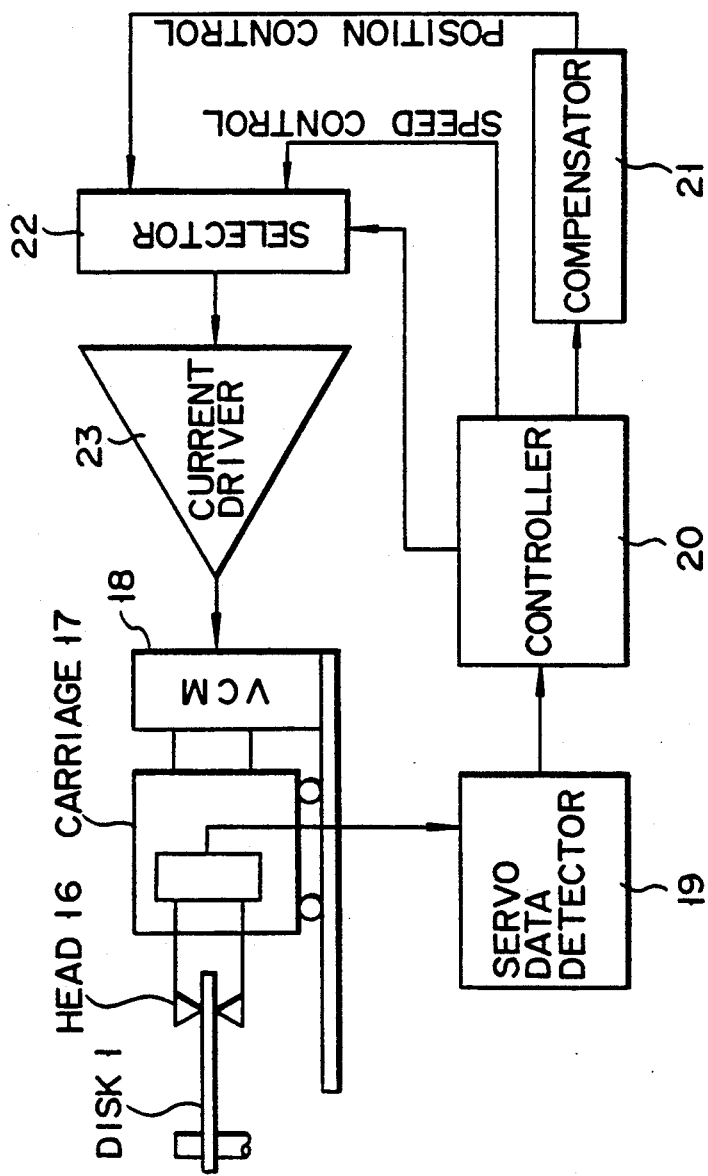
F I G. 5

HEAD POSITIONING CONTROL METHOD AND APPARATUS

BACKGROUND OF THE INVENTION

1. Field of the Invention

The present invention relates to a system for controlling the positioning of a head to a recording track on a recording medium in order to record data on the recording track and/or reproduce data therefrom in a recording/reproduction system using a disk-shaped recording medium, and more particularly, to a control method and apparatus for accurately and smoothly positioning a head on a target track using position data and moving speed data of the head.

2. Description of the Related Art

For instance, in conventional disk devices, e.g., some hard disk devices, which control the closed-loop positioning of a head using sector data of a plurality of sectors set in radial on a recording surface of a disk-shaped recording medium (hereinafter referred to as a disk) or servo data in a servo data section formed in advance in part of each sector, the positioning of the head on the target track for disk access is executed by the speed control for moving the head to the proximity of the target track at a high speed and the position control for accurately tracking the head onto the target track. In other words, the head is moved at a high speed through the speed control until the head reaches within a predetermined track range (e.g., 0.5 track range) of the target track, and after the head reaches this predetermined range, the speed control mode is switched to the position control mode and the head is then controlled to accurately seek the target track. In the speed control, the head should be moved to the proximity of the target track at a high speed and the speed of the head should be made substantially zero at the time of the mode change from the speed control mode to the position control mode for smooth transition to the position control from the speed control. For this purpose, a target speed profile which is a profile for the proper head moving speed as shown in FIG. 1A is set in advance in accordance with the distance between the track the head is positioned (or on track) at the time of the mode change and the target track on which the head should be positioned next. A voice coil motor (VCM) for driving the head is supplied with a drive current as shown in FIG. 1B to execute head movement control for moving the head in accordance with the target speed profile. The actual head moving speed is acquired from the servo data provided on the disk recording surface or is detected by an external speed sensor.

In the speed control mode, the head moving speed is accelerated at an acceleration $\alpha_a$ until it reaches the maximum speed $V_{max}$ and is decelerated from this maximum speed $V_{max}$ at an acceleration $\alpha_d$ until it stops. The acceleration interval $X_a$ for which the head moves at the acceleration $\alpha_a$, the constant-velocity interval $X_O$ for which the head moves at the maximum speed $V_{max}$, and the deceleration interval $X_d$ for which the head decelerates at the acceleration $\alpha_d$ are expressed as follows:

$$X_a = (\tfrac{1}{2})\alpha_a \cdot t_a^2,$$

$$X_O = V_{max} \cdot t_O, \text{ and}$$

$$X_d = (\tfrac{1}{2})\alpha_d \cdot t_d^2$$

where $t_a$ is the acceleration time, $t_O$ is the constant velocity and $t_d$ is the deceleration time. Based on the seek distance $X_s$ between tracks which the head should move, aforementioned target speed profile is set by properly selecting these times $t_a$, $t_O$ and $t_d$ in such a way as to make $$X_s = X_a + X_O + X_d.$$

In the position control mode, the tracking control is executed on the basis of a position signal acquired from the servo data provided on the disk recording surface. For instance, with a two-phase di-bit pattern used as servo data, position signals X and Y and their inverted versions $-X$ and $-Y$ as shown in FIG. 2 are acquired, and the following position signals are selectively used in each track for position control:

4N track → Signal X
4N+1 track → Signal $-Y$
4N+2 track → Signal $-X$
4N+3 track → Signal Y (N=0, 1, 2, ...)

For instance, in positioning the head onto the 4N track (or 4N-th track), servo control is executed in such a way that, with the signal X being used as the position signal, the voice coil motor is supplied with a drive current which moves the head toward outer tracks if the position signal voltage is positive and moves the head toward inner tracks if it is negative, thereby rendering the position signal voltage zero. In general, a controller system includes a phase advance compensator for compensating for phase advance of a control signal component near the servo region in order to provide a stable servo system and a phase delay compensator for compensating for phase delay of a control signal component of a low region in order to increase the stiffness and reduce an error in the steady state.

Recently, there is an increased demand for a larger capacity and higher access for a flexible disk device as well as other memory devices. In this respect, therefore, some consideration is being given to employing, even in flexible disk devices, the sector tracking servo technique in which servo data is formed in sectors on a disk recording surface in advance and a voice coil motor serving as a head drive mechanism for positioning the head, as per hard disk devices, whereby the track density and the access speed are increased. In flexible disk devices, however, theoretically speaking, the head contacts a disk so that the rotational speed of the disk cannot be increased much considering the durability and spacing loss of the disk, for example. Accordingly, such flexible disk devices cannot have a high sampling frequency for servo data, so that they generally have a low servo region as well as a low stiffness as compared with hard disk devices, and are susceptible to disturbance.

Assuming that the head on the 4N track shifts to the 4N+1 track (off track) due to disturbance or the like, a drive current flows through the voice coil motor to move the head toward outer tracks, thereby positioning the head again on the 4N track. If the head shifts from the 4N track further inward of the 4N+2 track or outward of the 4N−2 track, however, the head cannot be repositioned on the 4N track in the position control mode.

The speed of the head at the time the speed control mode is switched to the position control mode is zero under idealistic speed control; however, the position control actually starts with a slight initial speed of the head. In this case, as per the above case, the initial speed may cause a large overshoot so that the head reaches further inward of the 4N+2 track or outward of the 4N−2 track, not the 4N track, its target. In this case also, the head cannot be positioned on the target track in the position control mode.

The following measures can be taken for this case.

(1) The head is temporarily moved to a reference track position which is normally set at the innermost track or outermost track, the reference track is detected and position control is again executed to move the head from the reference track to the target track. However, this measure requires a significant time for the head after shifting off the target track to return to the target track.

(2) If disturbance is relatively small, the head will eventually position on any of $4(N\pm n)$ tracks ($n\neq 0$). Therefore, after the head becomes steady on that track, the head is repositioned to the target track by executing the speed control and position control in succession. With this measure, however, it is not possible to predict the time for the head to be steadily positioned on the $4(N\pm n)$ track. Further, if disturbance is large, often $n>10$, and at the worst, the head may be shifted to the outermost or innermost region and hit against other than tracks.

According to the general head positioning control system based on the prior art system, once the head is moved off the position-controllable range, the head cannot be immediately returned to the target track only by the position control, nor can it be quickly returned to the track using other measures.

SUMMARY OF THE INVENTION

Accordingly, it is an object of this invention to provide a head positioning control method and apparatus which can reposition a head to a target track surely and quickly even if the head is shifted off a position-controllable range from the target track.

The head positioning control method and apparatus of this invention for positioning a head to a target track by speed control and position control in succession are characterized in that when the head shifts by a predetermined distance or more from the target track on which the head is presently tracking in the position control mode, or when such a head shifting occurs in the position control mode after the speed control is changed to the position control during disk access (for track seek), the mode is changed to the speed control mode, and the speed control and the position control in succession are immediately executed from where the head is positioned to reposition the head to the target track. In other words, if the head shifts off a position-controllable range from the target track to which the head is tracking in the position control mode or on which the head is moved by the position control during disk access, the position control mode is immediately switched to the speed control mode and the speed control and position control in succession are executed from that point, thereby surely and quickly repositioning the head onto the target track.

According to the present head positioning control method and apparatus, if the head shifts off a position-controllable range from the target track to which the head is tracking in the position control mode or on which the head is tracking through the position control during disk access, the head can be surely and quickly repositioned onto the target track. This can significantly shorten the time required for compensating for a head positioning error and can significantly improve the throughput as well as reliability of a disk device.

BRIEF DESCRIPTION OF THE DRAWINGS

FIGS. 1A and 1B are diagrams for explaining speed control;

FIG. 2 is a diagram for explaining position signals used in position control;

FIGS. 4A and 4B are exemplary diagrams illustrating position signals and servo patterns for explaining the relation between position signals and servo patterns which give servo data used in the above embodiment;

FIG. 5 is a block diagram of a head positioning control system according to this embodiment;

FIG. 6 is a flowchart of seek control in this embodiment;

DETAILED DESCRIPTION OF THE PREFERRED EMBODIMENT

A preferred embodiment of this invention will be described below with reference to the accompanying drawings.

Figure 3:
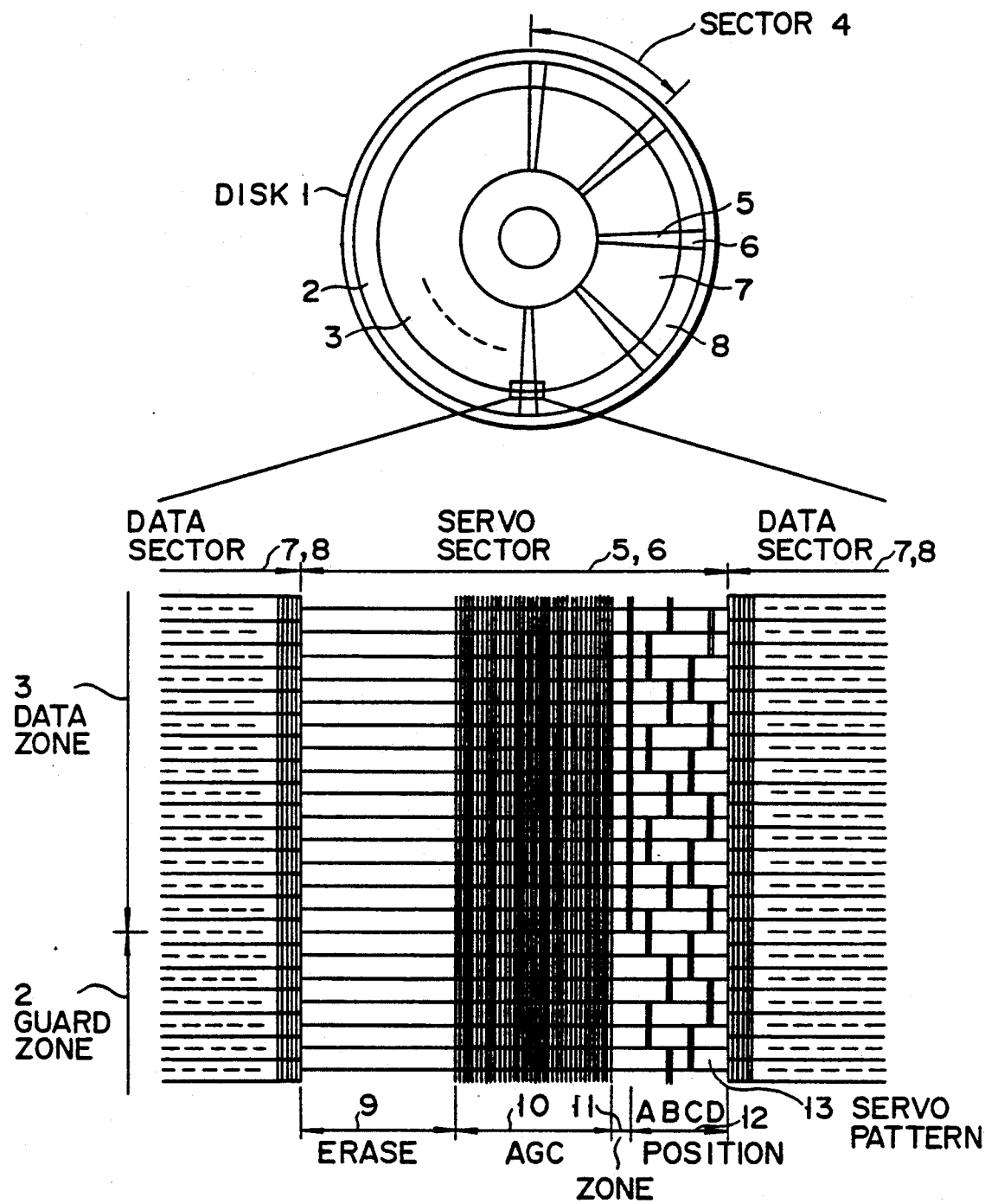
FIG. 3 is a typical diagram illustrating a schematic recording pattern and a detailed servo pattern of a disk which are used in a head positioning control method and apparatus according to one embodiment of this invention.

A disk 1 shown in FIG. 3 has a recording surface formed on either surface. Each recording surface of disk 1 is provided with a data zone 3 for data recording and a guard zone 2 located outward of the data zone 3. The guard zone 2 is formed at the outermost region of disk 1 to have a width corresponding to several dozens of tracks in order to detect a reference track located at the outermost region of data zone 3. Generally, no data writing/reading is effected in this zone 2.

These guard zone 2 and data zone 3 are each divided into a plurality of radial sectors 4. Each sector 4 of data zone 3 and each sector 4 of guard zone 2 are respectively constituted by servo sectors 5 and 6 on which servo data is written and data sectors 7 and 8 to be accessed for data writing/reading.

Servo sectors 5 and 6 each consists of four portions: an erase portion 9, an AGC (automatic gain control) portion 10, a zone portion 11 and a position portion 12. Erase portion 9 is for detecting the head of each sector. AGC portion 10 stores a signal used as a reference in executing automatic gain control for adjusting the signal level between sectors and between tracks. Zone portion 11 is provided to separate data zone 3 from guard zone 2. Position portion 12 is provided for detecting the radius-directional position on a disk recording medium, and it generally has a 2-phase servo signal 13 written therein, which is called a 2-phase di-bit pattern.

Position bit signals A, B, C and D are gated and sampled to be sequentially extracted by a sample gate signal synchronized with the head of sector 4 that is discriminated by detecting erase portion 9, and the peaks of signals A, B, C and D are held, thereby providing signals $P_A$, $P_B$, $P_C$ and $P_D$. The following first position signal group is acquired from the peak signals $P_A$, $P_B$, $P_C$ and $P_D$:

$$X = P_A - P_B$$

$$Y = P_C - P_D$$

Further, the following second position signal group is acquired from these signals X and Y:

$$U = X + Y$$

$$V = X - Y$$

FIGS. 4A and 4B illustrate the positional relation between the head and the levels of these position signals X, Y, U and V. With the maximum speed of the head being, for example, 4 tracks/sector or less, it is possible to discriminate in which section $L_0$, $L_1$, $L_2$ or $L_3$ the head is present by determining the levels of signals X and Y, and it is also possible to discriminate the accurate position of the head by using signals U and V that indicate a linear change in these section $L_0$ to $L_3$, as shown in FIGS. 4A and 4B.

That is, it is possible to find out in which section $L_0$, $L_1$, $L_2$ or $L_3$ the head lies by acquiring position signals X and Y first and then making the following decisions based on X and Y:

$L_0$: $X \geq 0$, $Y > 0$ $L_1$: $X > 0$, $Y \leq 0$ $L_2$: $X \leq 0$, $Y < 0$ $L_3$: $X < 0$, $Y \geq 0$.

The position of the head within each section can be attained by applying U and V to the following equations:

$$D_0 = V/a + 0.5; \ L_0$$

$$D_1 = 0.5 - U/a; \ L_1$$

$$D_2 = 0.5 - V/a; \ L_2$$

$$D_3 = U/a + 0.5; \ L_3$$

where a is the peak-to-peak value of X and Y shown in FIG. 4A. If section $L_B$ where the head is positioned in previous sector and position $D_B$ of the head within section $L_B$ are stored in a memory, the current position $P_P$ of the head on the disk can be attained from section $L_P$ in which the head currently exists and position $D_P$ in section $L_P$ at which the head is positioned.

Figure 7:
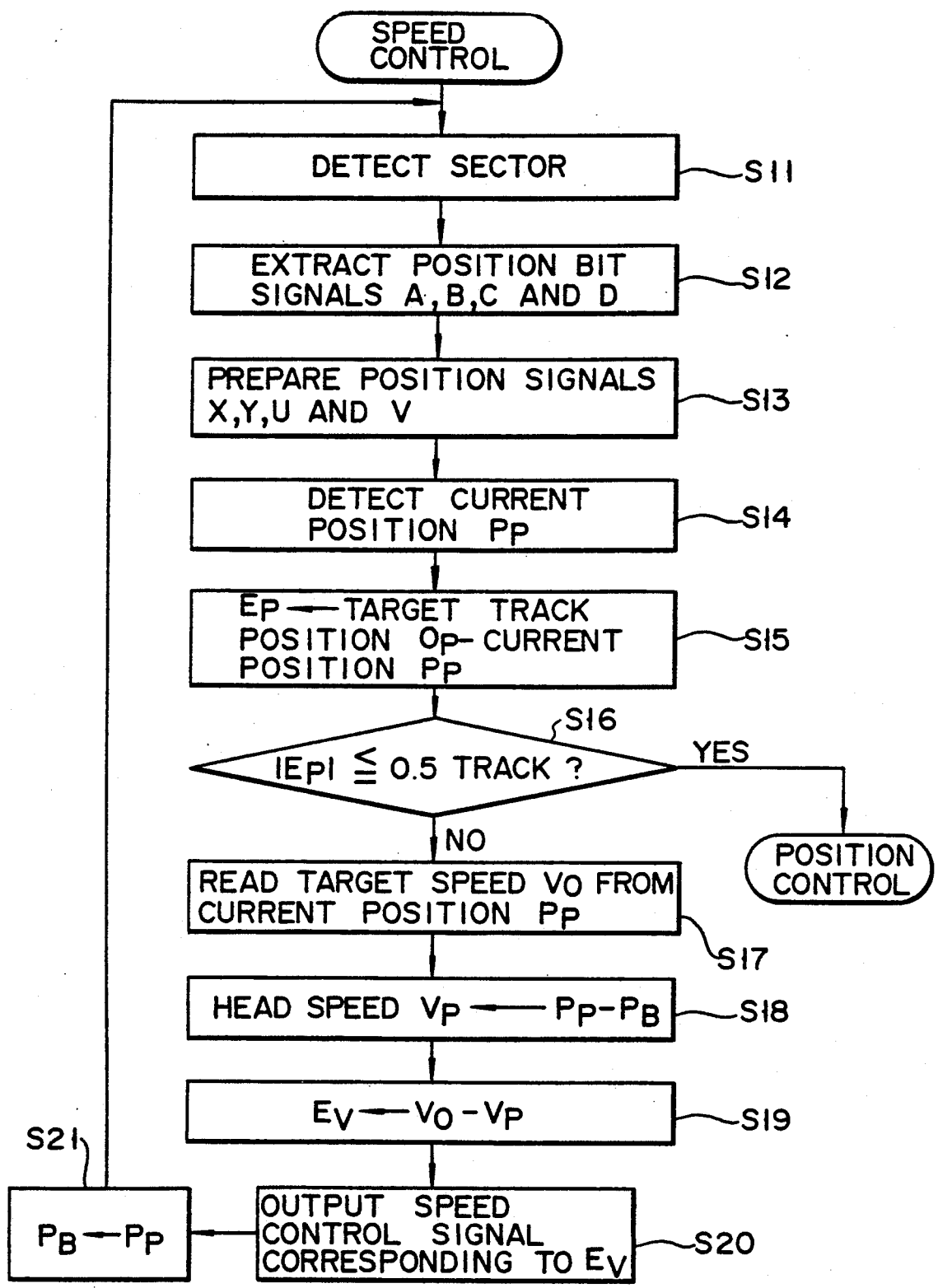
FIG. 7 is a flowchart of speed control in this embodiment.
Figure 8:
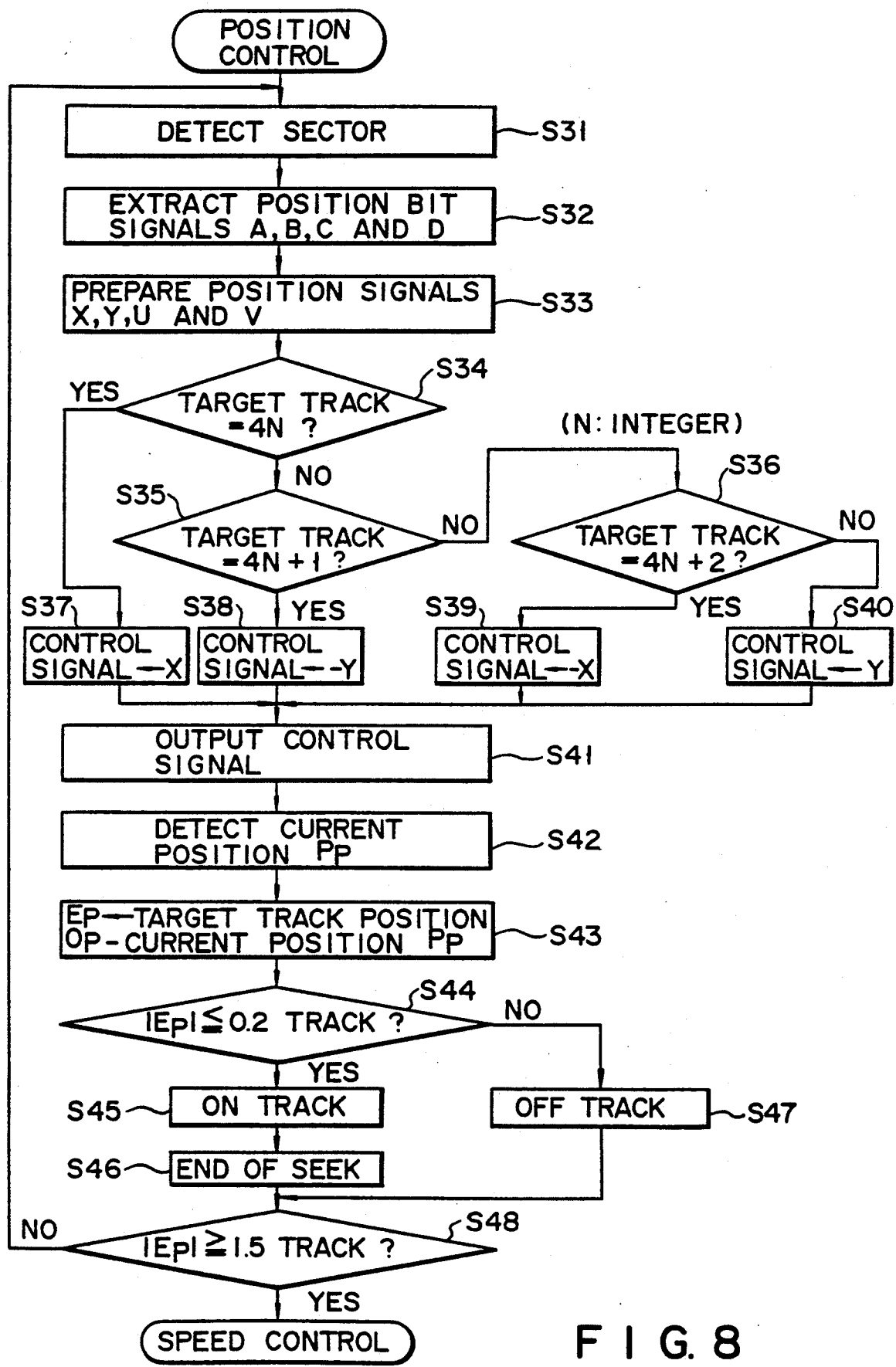
FIG. 8 is a flowchart of position control in this embodiment.

Referring now to the block diagram of the control system shown in FIG. 5 and the flowcharts of FIGS. 6-8, a description will be given of the speed control and position control for the head which are executed in accessing disk 1.

FIG. 5 illustrates only what is concerned with positioning control of the head. A head 16 for accessing disk 1 is supported by a carriage 17 driven by a VCM (voice coil motor) 18. A servo data detector 19 detects the aforementioned servo data from a reproduction signal from head 16 and sends it to a controller 20. This controller 20 sends a selection control signal to a selector 22 for selectively switching between speed control and position control modes, and outputs a speed control signal and a position control signal. The speed control signal or position control signal selected by selector 22 is supplied to VCM 18 through a current driver 23. A compensator 21 executes a phase compensation with respect to the position control signal from controller 20.

Controller 20, which is constituted by, for example, a microcomputer and performs the general control of the disk device, accepts a seek command from a disk controller (not shown) by way of interruption to seek a target track to be accessed next, and then attains the difference between the current position $P_P$ (stored in a memory) of head 16 and the position $O_P$ of the target track from a detection signal from servo data detector 19, thereby acquiring a seek distance $S_D$ (step S1; FIG. 6). Further, controller 20 reads out a target speed profile as shown in FIG. 1A which has been prepared in advance according to the seek distance $S_D$ and stored in a memory (not shown) (step S2) and then enters the speed control mode.

In the speed control mode, in the above-described procedures, a sector is detected (step S11; FIG. 7), signals A, B, C and D are detected (step S12), signals X, Y, U and V are acquired (step S13), the current position $P_P$ is detected (step S14), a positional error $E_P$ is acquired in the same manner as has been done for the seek distance $S_D$ (step S15), and the target speed $V_O$ to reach the current position $P_P$ is attained (step S17) when $E_P$ exceeds 0.5 track (step S16). The actual speed $V_P$ of the head is calculated by the following equation based on the head's position $P_B$ in the previous sector and the current position $P_P$ (step S18):

$$V_P = P_P - P_B.$$

Controller 20 compares this actual speed $V_P$ with the target speed $V_O$ to attain the difference $E_V$ (step S19) and sends a speed control signal corresponding to $E_V$ to selector 22 (step S20) to thereby control the movement of head 16. After substituting the current position $P_P$ for the position $P_B$, controller 20 returns to step S11 to detect the next sector. According to the sector servo system, the above control sequence is repeated upon each sector detection and head 16 is moved near the target track at a high speed.

When the difference $E_P$ between the head's current position $P_P$ and target track position $O_P$ becomes within 0.5 track (step S16), controller 20 switches the control mode to the position control mode from the speed control mode.

In the position control mode, after a sector is detected (step S31), position signals A, B, C and D are extracted (step S32) and position signals X, Y, U and V are calculated (step S33) as per the speed control mode. As mentioned earlier, controller 20 then discriminates whether the target track is 4N, 4N+1, 4N+2 or 4N+3 (steps S34 to S36), and outputs one of position control signals X, −Y, −X and Y (steps S37–S41) to execute tracking control. The position control signal should be output as soon as possible after the detection of the position signals. This is because a delay in this operation leads to a phase delay in the servo system and, if this phase delay becomes large, the servo system becomes unstable and an oscillation may occur at the worst. After outputting the position control signal, controller 20 attains the current position $P_P$ (step S42), then attains the difference $E_P$ between the current position $P_P$ and the target track position $O_P$ (step S43). If $E_P$ becomes within 0.2 track over a range of a predetermined number of sectors (steps S44 and S47), controller 20 considers that the head is on the target track (step S45) and sends a signal representing the end of the seek to the disk controller (step S46).

If the positional error $E_P$ becomes 2 tracks or more, however, the tracking control to the target track cannot be executed any more by the position control, so that it is necessary to immediately switch to the speed control mode. Here, when $E_P$ becomes 1.5 tracks or more, the control mode is switched to the speed control mode (step S48). After the mode switching, the current position $P_P$ in the next sector to be detected is acquired (steps S11-S14), the positional error $E_P$ between the current position $P_P$ and the target track position $O_P$ is calculated (step S15), and the speed control is executed, as mentioned earlier, until the head comes within a 0.5 track range from the position $O_P$.

In the above manner, the speed control mode and position control mode are repeated until the head is on the target track. During the interval between the point of switching the mode to the speed control mode and the point at which the speed control starts, a control signal is output which renders the drive current for the voice coil motor zero.

Further, even after the head is positioned on the target track, the current position $P_P$ of head 16 is continuously attained, and if head 16 shifts by $\pm 1.5$ tracks or more, the mode is switched to the speed control mode and the above control sequence is executed to reposition the head on the target track.

This invention is in no way restricted to the above particular embodiment, but can be modified in various manners within the scope and spirit of the invention.

For instance, the off-track limit for switching to the speed control mode from the position control mode is not restricted to 1.5 tracks, but can be any value which is within a range to permit position control, yet may disable the position control. With a 2-phase di-bit pattern being used as servo data for detecting the head position, the off-track limit can be any value within 2 tracks.

The servo data is not limited to such a 2-phase di-bit pattern; for instance, a 4-phase di-bit pattern can serve as the servo data as well.

The application of this invention is not restricted to the aforementioned sector servo system. This invention can apply not only to various servo systems having servo data and data recorded on the same recording surface but also to servo systems having servo data and data recorded on separate recording surfaces and a system that attains head position data and speed data from an external sensor, not from a disk surface, as long as the applied system of the type which performs head positioning by a combination of speed control and position control.

What is claimed is:

1. A head positioning control method having a speed control mode in which a head is moved by controlling a speed of said head and a position control mode in which said head is positioned onto a target track in accordance with position data of said head attained from tracking servo data detected from a disk-shaped recording medium, and for controlling movement of said head in said speed control mode until said head reaches a first predetermined distance from said target track and for controlling movement of said head in said position control mode when said head reaches within said first predetermined distance from said target track, thereby permitting said head to access said target track, said method comprising:

a first step of detecting that said head shifts off from said accessed target track by a second predetermined distance or more in said position control mode;

a second step of switching said position control mode to said speed control mode when said head shifts off from said accessed target track by said second predetermined distance or more is detected in said first step;

a third step of detecting that said head reaches within said first predetermined distance from said accessed target track in said speed control mode; and a fourth step of switching said speed control mode to said position control mode when it is detected that said head has reached within said first predetermined distance from said target track in said third step.

2. The method according to claim 1, wherein said first predetermined distance is a distance sufficient to shift said head to said target track in said position control mode.

3. The method according to claim 2, wherein said tracking servo data is acquired from a 2-phase di-bit pattern provided on said disk-shaped recording medium and said first predetermined distance corresponds to 0.5 track.

4. The method according to claim 1, wherein said second predetermined distance is within a range which permits said head to shift to said target track in said position control mode.

5. A head positioning control method having a speed control mode in which a head is moved by controlling a speed of said head and a position control mode in which said head is positioned onto a target track in accordance with position data of said head attained from tracking servo data detected from a disk-shaped recording medium, and for controlling movement of said head in said speed control mode until said head reaches a first predetermined distance from said target track and for controlling movement of said head in said position control mode when said head reaches within said first predetermined distance from said target track, thereby permitting said head to access said target track, said method comprising:

a first step of detecting that said head shifts off from said accessed target track by a second predetermined distance or more in said position control mode, said second predetermined distance being greater than said first predetermined distance and being within a range which permits said head to shift to said target track in said position control mode;

a second step of switching said position control mode to said speed control mode when said head shifts off from said accessed target track by said second predetermined distance or more is detected in said first step;

a third step of detecting that said head reaches within said first predetermined distance from said accessed target track in said speed control mode; and a fourth step of switching said speed control mode to said position control mode when it is detected that said head has reached within said first predetermined distance from said target track in said third step.

6. The method according to claim 5, wherein said tracking servo data is acquired from a 2-phase di-bit pattern provided on said disk-shaped recording medium and said second predetermined distance corresponds to 0.5 to 2 tracks.

7. The method according to claim 6, wherein said second predetermined distance corresponds to 1.5 track.

8. A head positioning control apparatus comprising:
position detecting means for detecting a position of a head on a disk-shaped recorded medium based on tracking servo data acquired from said recording medium;
drive means for driving said head to move said head on said recording medium; and
control means having a speed control mode in which said head is moved by controlling a speed of said head and a position control mode in which said head is positioned onto a target track in accordance with position data of said head and for controlling said drive means based on position data detected by said position detecting means, for controlling movement of said head in said speed control mode until said head reaches a first predetermined distance from said target track and for controlling movement of said head in said position control mode when said head reaches within said first predetermined distance from said target track, thereby permitting said head to access said target track, said control means including
means for switching said position control mode to said speed control mode upon detection that said head shifts off from said accessed target track by a second predetermined distance or more in said position control mode, and switching said speed control mode to said position control mode upon detection that said head reaches within said first predetermined distance from said accessed target track in said speed control mode.

9. The apparatus according to claim 8, wherein said position detecting means includes means for detecting a position of said head based on said tracking servo data acquired from a 2-phase di-bit pattern provided on said disk-shaped recording medium.

10. The apparatus according to claim 9, wherein said first predetermined distance corresponds to 0.5 track.

11. The apparatus according to claim 8, wherein said first predetermined distance is a distance sufficient to shift said head to said target track in said position control mode.

12. The apparatus according to claim 8, wherein said second predetermined distance is within a range which permits said head to shift to said target track in said position control mode.

13. A head positioning control apparatus comprising:
position detecting means for detecting a position of a head on a disk-shaped recording medium based on tracking servo data acquired from said recording medium;
drive means for driving said head to move said head on said recording medium; and
control means having a speed control mode in which said head is moved by controlling a speed of said head and a position control mode in which said head is positioned onto a target track in accordance with position data of said head and for controlling said drive means based on position data detected by said position detecting means, for controlling movement of said head in said speed control mode until said head reaches a first predetermined distance from said target track and for controlling movement of said head in said position control mode when said head reaches within said first predetermined distance from said target track, thereby permitting said head to access said target track, said control means including
means for switching said position control mode to said speed control mode upon detection that said head shifts off from said accessed target track by a second predetermined distance or more in said position control mode, and switching said speed control mode to said position control mode upon detection that said head reaches within said first predetermined distance from said accessed target track in said control mode, said second predetermined distance being greater than said first predetermined distance and being within a range which permits said head to shift to said target track in said position control mode.

14. The apparatus according to claim 13, wherein said second predetermined distance corresponds to 0.5 to 2 tracks.

15. The apparatus according to claim 14, wherein said second predetermined distance corresponds to 1.5 tracks.

* * * * *